(12) United States Patent
Marcjan

(10) Patent No.: US 7,051,282 B2
(45) Date of Patent: May 23, 2006

(54) MULTI-LAYER GRAPHICAL USER INTERFACE

(75) Inventor: Cezary Marcjan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 13 days.

(21) Appl. No.: 10/460,912

(22) Filed: Jun. 13, 2003

(65) Prior Publication Data

US 2004/0255253 A1 Dec. 16, 2004

(51) Int. Cl.
*G06F 3/00* (2006.01)

(52) U.S. Cl. ........................ 715/743; 715/768; 715/741

(58) Field of Classification Search ................ 715/700, 715/713, 733–734, 753, 779, 763–767, 802–803, 715/768, 741, 743
See application file for complete search history.

(56) References Cited

U.S. PATENT DOCUMENTS

| | | | | |
|---|---|---|---|---|
| 5,574,898 A | * | 11/1996 | Leblang et al. | ................ 707/1 |
| 5,745,711 A | * | 4/1998 | Kitahara et al. | ............ 715/759 |
| 6,061,684 A | | 5/2000 | Glasser et al. | |
| 6,112,024 A | * | 8/2000 | Almond et al. | ............. 717/122 |
| 6,266,058 B1 | * | 7/2001 | Meyer | ........................ 715/733 |
| 6,308,173 B1 | | 10/2001 | Glasser et al. | |
| 6,362,892 B1 | | 3/2002 | Lee et al. | |
| 6,384,849 B1 | * | 5/2002 | Morcos et al. | .............. 715/810 |
| 6,633,310 B1 | | 10/2003 | Andrew et al. | |
| 6,636,250 B1 | * | 10/2003 | Gasser | ........................ 715/853 |
| 2004/0046784 A1 | | 3/2004 | Shen et al. | |

OTHER PUBLICATIONS

Flavio De Paoli, et al., Requirements for a Layered Software Architecture Supporting Cooperative Multi-User Interaction, Procceedings of ICSE, 1996, pp. 408-417.
International Search Report. PCT/US04/18384, mailed Jun. 17, 2005.

* cited by examiner

*Primary Examiner*—Kieu D. Vu
(74) *Attorney, Agent, or Firm*—Amin & Turocy, LLP

(57) ABSTRACT

A multi-layer graphical user interface provides multiple types of information in at least two layers of a common display space, such as a window. In one implementation, a shared network folder includes two layers of display objects to separately represent files contained in the folder and users with whom the folder is shared. The first or top layer may represent the files with conventional words, icons or other symbols. The second or lower level may represent the users with whom the folder is shared with words, icons or other symbols that are dimmed, blurred, or otherwise de-emphasized relative to the top layer.

7 Claims, 4 Drawing Sheets

Fig. 1 - Prior Art
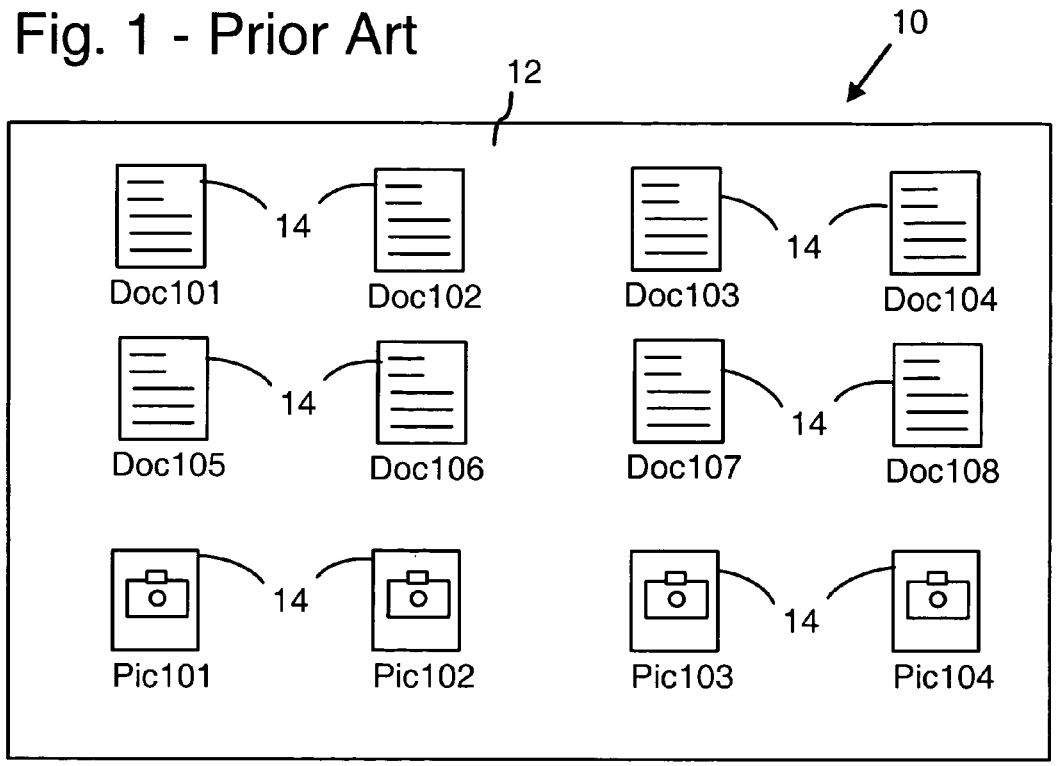
Fig. 2
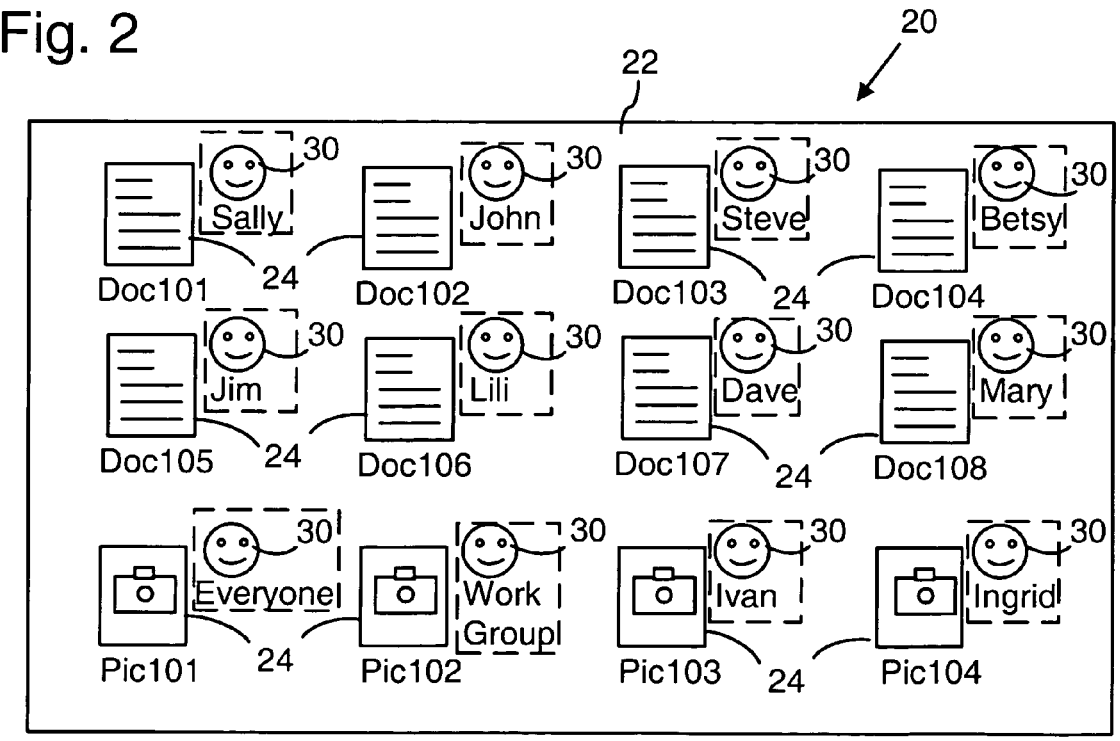

MULTI-LAYER GRAPHICAL USER INTERFACE

FIELD OF THE INVENTION

The present invention relates to graphical user interfaces and, in particular, to a graphical user interface that renders different types of information in different layers of a shared display area.

BACKGROUND AND SUMMARY OF THE INVENTION

Many graphical user interfaces for computers are based on a desktop metaphor that creates a graphical environment simulating work at a desk. These graphical user interfaces typically employ a windowing environment within the desktop. The windowing environment presents the user with specially delineated areas of the screen called windows, each of which is dedicated to a particular application program, file, document, or group of files (e.g., a folder).

FIG. 1 is an illustration of a prior art graphical user interface 10 of a computer network folder 12 containing multiple computer files 14, such as document files, photo files, etc. It will be appreciated that computer files 14 in FIG. 1 are actually icons that represent or designate the files, but in the terminology of the art the icons or other symbols representing objects are referred to as the objects themselves. User interface 10 is rendered on display screens of user computers, for example.

Computer network folder 12 represents a computer or network space within which computer files 14 are stored. In the earliest personal computers, the folder in which a group of computer files was stored was dedicated to and accessible from only one computer. With the networking of computers, a folder such as computer network folder 12 may be accessible by many users from many different computers on a network.

In a computer network, for example, some network folders might be publicly shared and accessible to virtually any user on the network, and other folders might have access or sharing that is limited only to specified users. Folders with limited access or sharing would typically contain sensitive or private information that is not needed by all network users.

In prior art graphical user interface 10, computer files 14 are shown in computer network folder 12 in the same manner regardless of whether network folder 12 is widely shared, shared on a limited basis, or entirely private. A single layer of information, computer files 14, is rendered to identify the contents of folder 12. The single-layered representation does not indicate any other information or property, such as the extent to which files in the folder are shared, even though such a property could be very important to how a user works with the folder contents.

As a result, current implementations of shared computer spaces, like network folders or "shares," can facilitate serious breaches of network security. When they create shared network spaces such as folder 14, users do not always maintain the access rights (i.e., shared access) so that in time the shared status of the space can be forgotten. As a result, sensitive files might then be stored in a network space that is shared with users for whom access rights are not intended.

Accordingly, the present invention provides a multi-layer graphical user interface that provides multiple types of information in at least two layers of a common display space, such as a window or desktop. In one implementation, a shared network folder includes two layers of display objects to separately represent files contained in the folder and users with whom the folder is shared. The first or top layer may represent the files with conventional words, icons or other symbols. The second or lower level may represent the users with whom the folder is shared with words, icons or other symbols that are dimmed, blurred, or otherwise de-emphasized relative to the top layer.

The multi-layer graphical user interface allows multiple distinct types of information to be rendered graphically in a common display space. As a result, the information of primary significance (e.g., the files) can be readily discernible by the user, while significant related information is rendered without degrading the display of primary significance with a clutter of display objects. In one implementation, the distinct types of information to be rendered may be selected from more than two distinct types of information in a type control bar.

Additional objects and advantages of the present invention will be apparent from the detailed description of the preferred embodiment thereof, which proceeds with reference to the accompanying drawings.

BRIEF DESCRIPTION OF THE DRAWINGS

FIG. 1 is an illustration of a prior art graphical user interface of a computer network folder.

FIG. 2 is an illustration of a multi-layer graphical user interface according to the present invention.

DETAILED DESCRIPTION OF PREFERRED EMBODIMENTS

Figure 3:
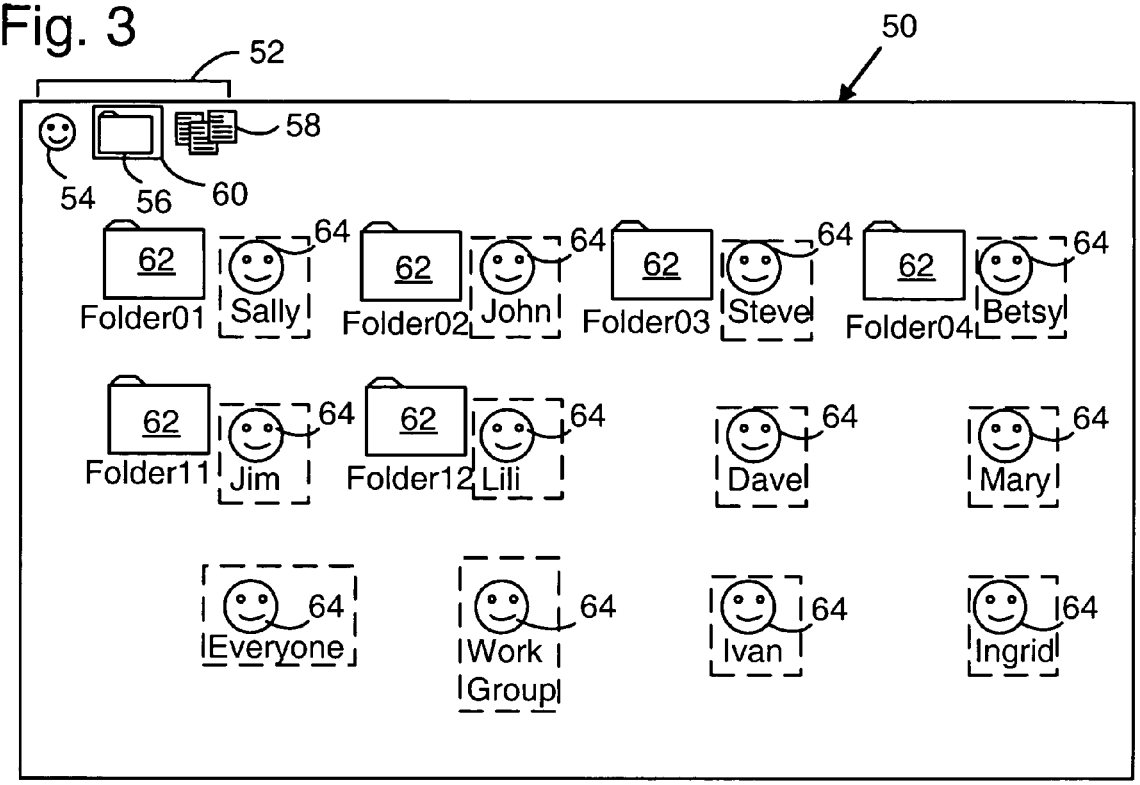
FIGS. 3–5 illustrate a multi-layer graphical user interface having a type control bar for rendering multiple graphical controls of more than two types.

FIG. 2 is an illustration of a multi-layer graphical user interface 20 according to the present invention. Multi-layer graphical user interface 20 is shown with regard to a computer network folder 22 containing multiple computer files 24, such as document files, photo files, etc. It will be appreciated that computer files 24 in FIG. 2 are actually icons that represent or designate the files, but in the terminology of the art the icons or other symbols representing objects are referred to as the objects themselves. User interface 20 is rendered on a display screen of user computer, for example.

Computer network folder 22 represents a computer or network space within which computer files 24 are stored. Network folder 22 may be accessible by many users from many different computers on a network. User interface 20 further includes one or more (multiple shown) user icons 30 representing users or groups of users with whom the network folder 22 is shared. Some of the user icons 30 may each represent multiple users, such as the "Everybody" icon representing all network users and the "Work Group" icon representing a user's immediate group of colleagues.

User icons 30 in FIG. 2 are illustrated within boxes that are drawn with broken lines to represent icons 30 being dimmed, blurred, faded, or otherwise de-emphasized relative to files 24 when rendered on a computer display. By analogy, de-emphasized user icons could be analogous to a watermark on paper. As other examples, user icons 30 could be de-emphasized by being rendered with different colors or shades relative to files 24. As a result, computer files 24 represent a top or front layer of user interface 20, and user icons 30 represent a lower or background layer.

User icons 30 provide a user viewing user interface 20 with a clear and integral indication of the shared status of network folder 22 and the users with whom folder 22 is shared. In one implementation, each user icon 30 also functions as a link or control for accessing a user interface (not shown) to modify that user's share or access rights to folder 22 without the need to change to a separate view or application. As a result, files 24 and user icons 30 provide access to underlying information or functionality whether rendered as a top layer or a lower layer of user interface 20.

Figure 4:
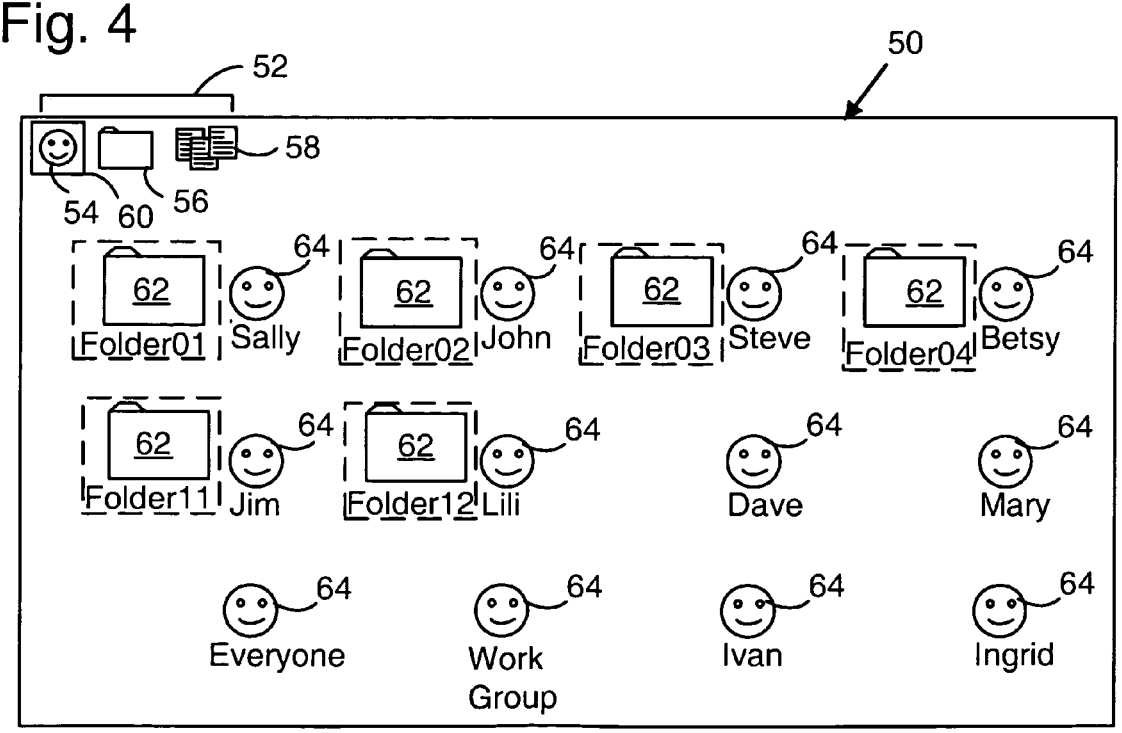
Figure 5:
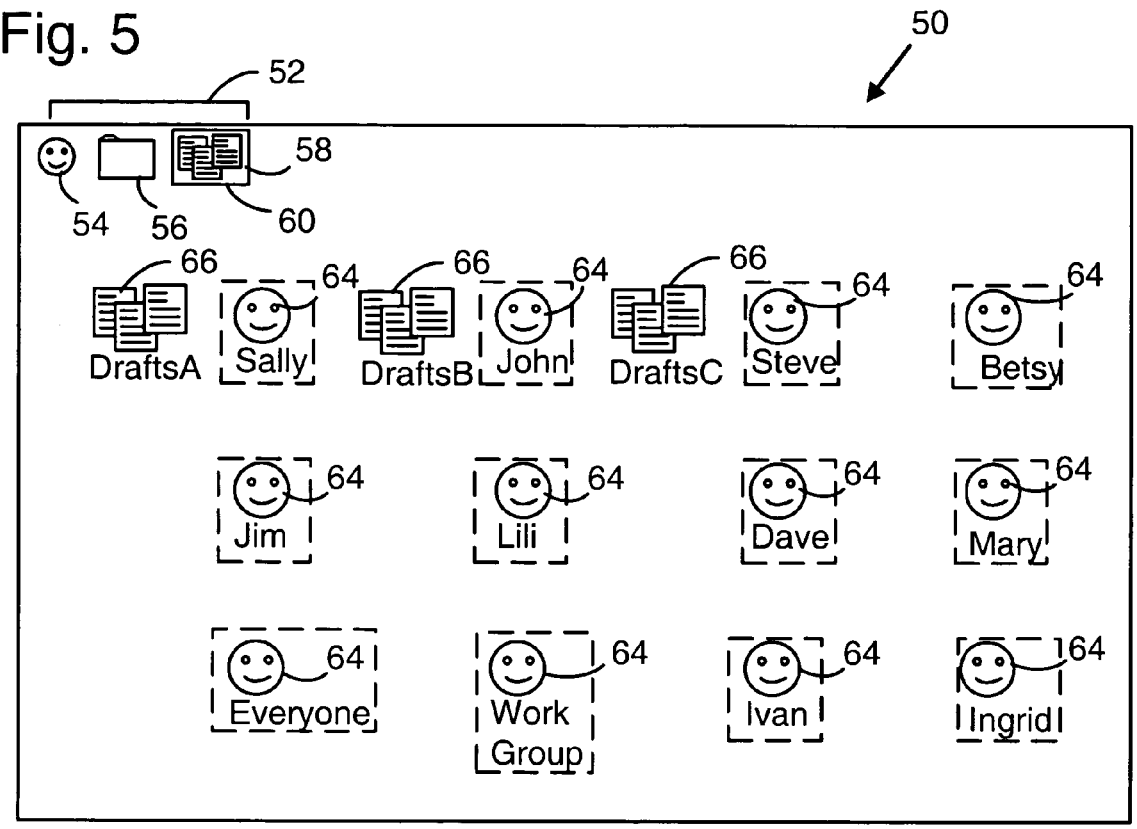

FIG. 2 illustrates a multi-level user interface 20 that renders multiple graphical controls of two types (i.e., files 24 and user icons 30) in each of two distinct levels. As another implementation of the present invention, FIGS. 3–5 illustrate a multi-layer graphical user interface 50 for rendering multiple graphical controls of more than two types. User interface 50 includes a type control bar 52 having controls 54, 56, and 58 representing three different types of data, objects, controls, etc. In this illustration, controls 54, 56, and 58 correspond to a users control, a folders control, and a drafts control, respectively.

FIG. 3 illustrates with a box 60 activation of folder control 56. Folder control 56 may be activated in any conventional graphical user interface manner (e.g., "clicking on it"), and an indication may be indicated in any manner. Box is merely an example of indicating activation.

Activation of folder control 56 functions to bring to a top level of user interface 50 folders 62 (i.e., folder icons) representing, for example, folders or sub-folders in a network space. User icons 64 are illustrated within boxes that are drawn with broken lines to indicate that icons 64 are rendered on a computer display screen in a de-emphasized manner (i.e., at a lower level) relative to folders 62. For example, folder 62 might be moved to the top level of user interface 50 so a user could manage or access information or files within the folders.

FIG. 4 illustrates with box 60 activation of users control 54. Users control 54 may be activated in any conventional graphical user interface manner, and an indication may be indicated in any manner. Activation of users control 54 functions to bring to a top level of user interface 50 user icons 64 representing, for example, users having share rights to folders 62. Folders 62 are illustrated within boxes that are drawn with broken lines to to indicate that folders 62 are rendered on a computer display screen in a de-emphasized manner (i.e., at a lower level) relative to user icons 64. For example, user icons 64 might be moved to the top level of user interface 50 so a user could manage or modify share or access rights for the users represented by user icons 64.

FIG. 5 illustrates with box 60 activation of drafts control 58. Drafts control 58 may be activated in any conventional graphical user interface manner, and an indication may be indicated in any manner. Activation of drafts control 58 functions to bring to a top level of user interface 50 draft icons 66 representing, for example, files that have multiple associated drafts or versions. With user icons in FIG. 4 previously being at the top level, activation of drafts control 58 causes the user icons 64 to move to the lower display level and the previously lower level folder icons 62 to be dropped from the display. User icons 64 are illustrated within boxes that are drawn with broken lines to indicate that icons 64 are rendered on a computer display screen in a de-emphasized manner (i.e., at a lower level) relative to drafts icons 66.

It will be appreciated that type control bar 52 can include any number of controls to accommodate any corresponding number of object types. In this implementation, two levels of objects are rendered at a time, with the top level of objects being rendered with emphasis relative to the lower level. As a result, activation of a control from type control bar 52 causes the objects for the activated type to be moved to the top level while the previously top level objects are rendered at the lower level.

Although described with reference to computer file management applications, it will be appreciated that multi-layer graphical user interfaces according to the present may be used in a variety of user interface applications. As one example, user notifications or system status indications could be rendered in a user's active window as a de-emphasized or background layer. Such user notifications or system status indications could include the arrival of an email message, an appointment reminder, a system resource warning, etc. In each of these cases, an indication could be rendered within the window of an unrelated application to notify the user in a noticeable, but unobtrusive and nondisruptive manner.

Figure 6:
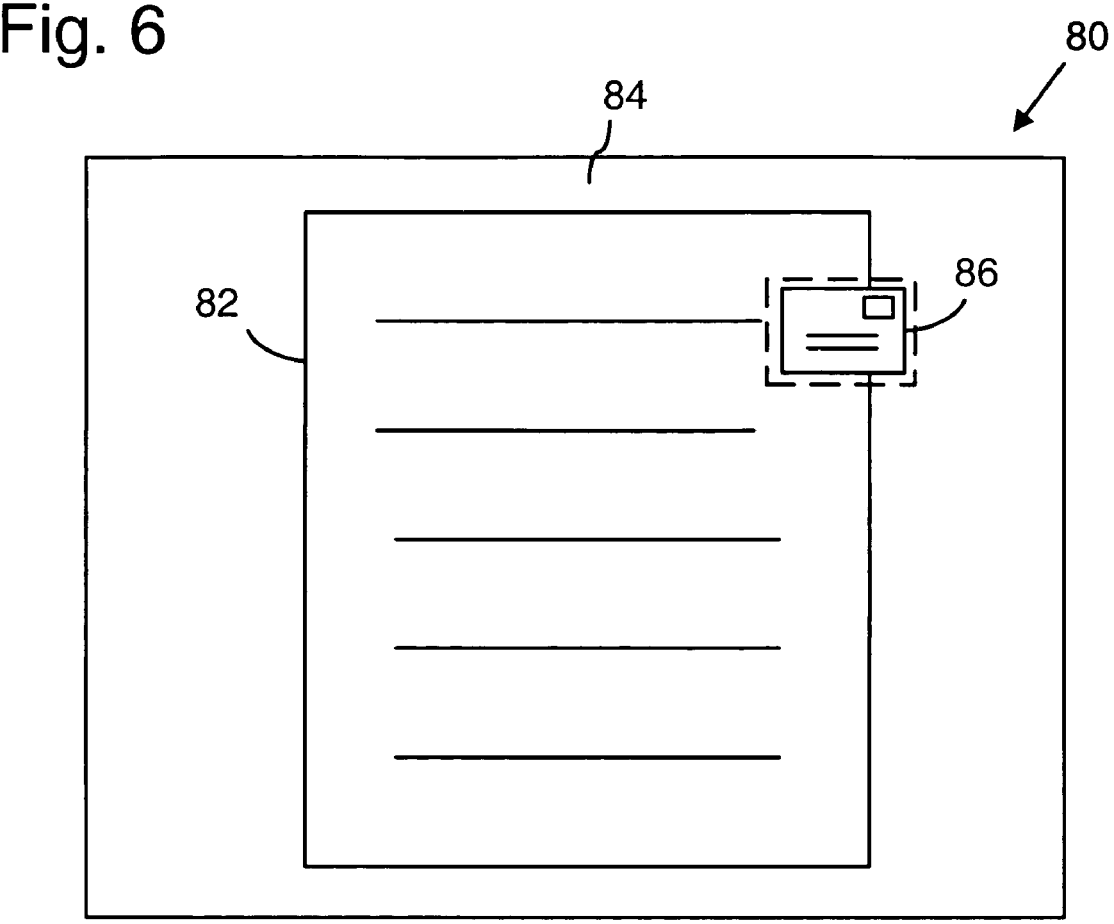
FIG. 6 illustrates a multi-level user interface.

FIG. 6 illustrates a multi-level user interface 80 that renders, for example, a text document 82 within a word processing application window 84. Text document 82 represents a top layer of the user interface 80. A notification indicator 86, such as an icon indicating that an email message has been received, is rendered as a second layer within window 84. Notification indicator 86 is rendered in a dimmed, blurred, faded or other de-emphasized manner relative to text document 82. The de-emphasized rendering of notification indicator 86 is indicated in FIG. 6 by broken lines.

As another example, multi-layer user interfaces according to this invention could be applied to Web page applications, such as to indicate users who are active on a page, users who are active on a page, related pages to the current one (icons), weather, related people, people near-by, etc.

Figure 7:
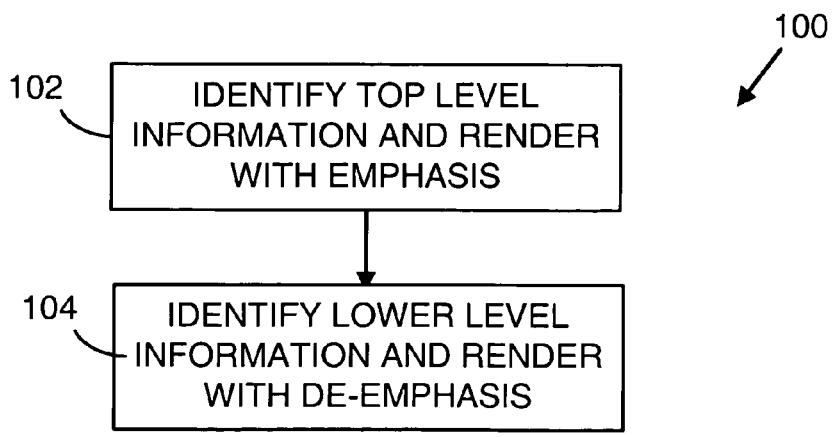
FIG. 7 illustrates a flow diagram of a computer-implemented multi-layer user interface method.

FIG. 7 is a flow diagram of a computer-implemented multi-layer user interface method 100 for providing graphical user interface displays such as those illustrated in FIGS. 2–5.

In step 102, a top level information type is identified and rendered on a computer display screen in an emphasized (e.g., conventional) manner.

In step 104, a lower level information type is identified and rendered on a computer display screen in a de-emphasized manner, which may include blurring, fading, shading, etc. relative to a conventional rendering.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

The invention claimed is:

1. On a computer display screen, a multi-layer graphical user interface, comprising:
   a conventional rendering in a layer of a display area of one or more computer file objects of a first type within a computer space; and
   a de-emphasized rendering in another layer of the display area of one or more objects of a second type that are different from the first type, wherein at least one of the one or more objects of the second type represents users who share the computer space and also functions as a control for accessing a user interface to modify represented users' access rights to the one or more computer file objects of the first type without a need to change to a separate view or application, and wherein the de-emphasized rendering includes at least one of dimming, blurring, fading, shading, broken lines and watermarking of the one or more objects of the second type relative to the conventional rendering.

2. The user interface of claim 1 in which the computer space is a shared network space.

3. The user interface of claim 1 further comprising a type control bar for selecting to be rendered the one or more computer file objects of the first type and the one or more objects of the second type from among objects of the first type, the second type, and at least one other type.

4. The user interface of claim 3 in which activation of the type control bar for a selected object type results in the conventional rendering of one or more objects of the selected object type.

5. A multi-layer graphical user interface method, comprising:
   rendering in a conventional manner one or more computer file objects of a first type in a layer of a display area within a computer space; and
   rendering in a de-emphasized manner one or more objects of a second type that are different from the first type in another layer of the display area, wherein at least one of the one or more objects of the second type represents users who share the computer space and also functions as a control for accessing a user interface to modify represented users' access rights to the one or more computer file objects of the first type without a need to change to a separate view or application, and wherein the de-emphasized rendering includes at least one of dimming, blurring, fading, shading, broken lines and watermarking of the one or more objects of the second type relative to the conventional rendering.

6. The method of claim 5 further comprising rendering a type control bar for selecting to be rendered the top level information type and the one or more lower level information types from among at least three separate information types.

7. The method of claim 5, wherein the computer space is a shared network space.

* * * * *